United States Patent
Marjanovic et al.

(12)

(10) Patent No.: US 6,171,634 B1
(45) Date of Patent: Jan. 9, 2001

(54) PROCESS WITH A STARCH ADDITION STEP FOR PREPARATION OF FROZEN CULINARY PRODUCTS

(75) Inventors: Nicolas Marjanovic, Beauvais; Alfred Morand, Milly sur Therain; Jean Moreau, Beauvais, all of (FR)

(73) Assignee: Nestec S.A., Vevey (CH)

( * ) Notice: Under 35 U.S.C. 154(b), the term of this patent shall be extended for 0 days.

(21) Appl. No.: 09/287,420

(22) Filed: Apr. 7, 1999

(30) Foreign Application Priority Data

Apr. 8, 1998 (EP) .................................................. 98201083

(51) Int. Cl.⁷ ....................................................... A23L 1/39
(52) U.S. Cl. ........................... 426/589; 426/516; 426/524
(58) Field of Search .................................... 426/589, 524, 426/516, 518, 661

(56) References Cited

U.S. PATENT DOCUMENTS

| | | | |
|---|---|---|---|
| 2,191,509 | * | 2/1940 | Walsh et al. . |
| 2,440,517 | * | 4/1948 | Lesparre . |
| 2,811,452 | * | 10/1957 | Lesparre . |
| 2,909,431 | * | 10/1959 | Keller . |
| 3,332,785 | * | 7/1967 | Kuchinke et al. . |
| 3,843,805 | * | 10/1974 | Powell . |
| 3,868,470 | * | 2/1975 | Fallon et al. . |
| 4,038,424 | * | 7/1977 | Davies . |
| 4,118,518 | * | 10/1978 | Perryman . |
| 4,159,982 | * | 7/1979 | Hermanssan . |
| 4,192,900 | * | 3/1980 | Cheng . |
| 4,215,152 | * | 7/1980 | O'Rourke . |
| 4,415,599 | * | 11/1983 | Bos . |
| 4,568,550 | * | 2/1986 | Fulger et al. . |
| 4,568,551 | * | 2/1986 | Seewi et al. . |
| 4,671,966 | * | 6/1987 | Giddey et al. . |
| 4,810,518 | * | 3/1989 | Haisman et al. . |
| 5,264,235 | | 11/1993 | Duckworth ............................ 426/589 |
| 5,332,585 | * | 7/1994 | Odermatt et al. . |
| 5,368,877 | * | 11/1994 | Huang et al. . |
| 5,593,716 | * | 1/1997 | Appelquist et al. . |
| 5,759,581 | * | 6/1998 | Baensch et al. . |
| 5,987,898 | * | 11/1999 | Olofsson et al. . |

FOREIGN PATENT DOCUMENTS

| | | | |
|---|---|---|---|
| 290251 | 10/1983 | (DE) | ............................... F25D/25/04 |
| 713650 | 5/1996 | (EP) | ................................ A23G/9/20 |

OTHER PUBLICATIONS

Rombauer et al, "Joy of Cooking" pp. 318–327, 1973.*
Derwent Database Abstract, WPI Accession No. 96–252854/199626, XRAM Accession No. C96–080030, abstract of Fayard, et al. European Patent Application No. 0 713 650 (1996); and.
Derwent Database Abstract, WPI Accession No. 91–303894/199142, XRAM Accession No. C91–131635, abstract of Opel, et al., German Patent No. 290 251 (1991).

* cited by examiner

*Primary Examiner*—Cynthia L. Nessler
(74) *Attorney, Agent, or Firm*—Vogt & O'Donnell, LLP

(57) ABSTRACT

To prepare a food product, dehydrated pregelatinized starch and a mixture of hydrated gelatinized starch, fat and water are introduced into an apparatus for mixing and cooling the same to a temperature between −8° C. and −3° C. so that a frozen mixture is obtained from the apparatus, and then the frozen mixture is cut into portions and the portions are frozen. The hydrated gelatinized starch may be prepared by treating a dehydrated pregelatinized starch in admixture with water and fat so that it hydrates and swells, or it may be obtained by heating native/raw starch in admixture with water and fat by heating to hydrate and gelatinize the starch.

21 Claims, No Drawings

PROCESS WITH A STARCH ADDITION STEP FOR PREPARATION OF FROZEN CULINARY PRODUCTS

BACKGROUND OF THE INVENTION

The present invention relates to frozen culinary products and their preparation and particularly to products having a formulation which includes gelatinized starch and more particularly to products which have a formulation which includes gelatinized starch and a fat.

U.S. Pat. No. 5,264,235 (Duckworth M./CAMPBELL FROZEN FOODS) describes a deep-frozen culinary product of the creamy soup type which can be consumed after microwave heating and which is obtained by mixing oil, starch, maltodextrin and water, heating the mixture until partial swelling of the starch is obtained, packaging in individual containers and freezing.

European Patent Application Publication No. 0,713,650 (SOCIETÉ DES PRODUITS NESTLÉ) describes a device for the manufacture of aerated frozen products of the ice cream or sorbet type comprising a twin screw rotating in a jacketed barrel cooled by circulating a cryogenic fluid, and conduits for injecting gas are provided in a middle region of the barrel.

German Patent Document No. 290251 (VEB KERAMISCHE WERKE) describes a process for cooling a culinary product which is pasty or in puree form with the aid of a device comprising a transporting screw with a hollow axis rotating in a jacketed barrel, a cryogenic fluid circulating in the axis and the barrel, the product being cooled in this device to close to its freezing point and then being cut into pieces before being frozen.

SUMMARY OF THE INVENTION

The object of the present invention is to provide a deep-frozen creamy culinary product having a particularly unctuous texture after defrosting and an industrial process which is particularly efficient for manufacturing such a product.

To this effect, the deep-frozen culinary product according to the present invention has a water content of 60–85% by weight and comprises, in % by weight, 4–12% fat, 6–30% hydrated pregelatinized starch and 2.5–4% dehydrated pregelatinized starch.

In the process according to the present invention, a mixture comprising starch, water and fat is treated so as to pregelatinize and/or swell the starch, dehydrated pregelatinized starch is added thereto, the mixture is continuously frozen to a temperature of between −8° C. and −3° C., it is cut and/or it is formed into pieces and/or portions which are deep-frozen.

The product according to the present invention has a particularly unctuous texture in the mouth after defrosting. Surprisingly, it has a malleable texture after a relatively short microwave heating, especially after about 30–120 s and as soon as it has reached a temperature of between about −5° C. and 0° C.

The present process allows the efficient industrial manufacture of deep-frozen creamy culinary products of the sauce or mousse type presented in the form of pieces and/or portions.

DETAILED DESCRIPTION OF THE INVENTION

In the product of the present invention, the fat may be an animal or vegetable edible oil such as a groundnut, sunflower, olive, palm or butter oil, or a solid fat which is spreadable at room temperature such as butter or margarine, or mixtures thereof, for example.

The starch may be obtained from any dietary starchy material, especially from a cereal such as wheat or maize, or from a tuber vegetable such as potato or yam, for example.

The hydrated pregelatinized starch may be a native or chemically or physically modified starch which has been pregelatinized or precooked and/or swollen in boiling water, for example, and is subsequently entrained into the composition of the present product.

The dehydrated pregelatinized starch may be a native or chemically or physically modified starch which has undergone pregelatinization or precooking followed by dehydration, for example.

The present product may comprise, in addition, in % by weight, up to 10% milk solids-not-fat, up to 60% vegetable pulp, up to 5% egg white or yolk solids, up to 5% spice and salt, for example.

The present product may be an overrun product which exhibits a percentage overrun (increase in volume relating to the nonwhipped mass) of about 40–120% by volume, for example.

In the present process, a mixture of starch, fat and water is treated so as to gelatinize and/or swell the starch. A mixture can thus be treated such that it incorporates only a portion, especially a portion of oil, of the fat allowed for in the final product, it being possible for another portion of this fat, especially a butter or margarine portion, to be added to the mixture after this treatment.

If the starch is native or modified but not pregelatinized, this treatment can be carried out by heating at a temperature greater than the starch gelatinization temperature, especially a temperature of 80–100° C., for a period of time which is sufficient to obtain the gelatinization of the starch, especially for 2–30 min, for example.

If the starch is pregelatinized and dehydrated, this treatment can be carried out by simple stirring of the mixture at room temperature, especially at 15–35° C., for a period of time sufficient for the starch to swell by reabsorbing a quantity of water comparable to that which it lost during its dehydration after pregelatinization, especially for 2–30 min, for example.

Dehydrated pregelatinized starch is added to the treated mixture. This dehydrated pregelatinized starch may be a native or chemically or physically modified starch which has undergone pregelatinization or precooking followed by dehydration, for example.

This dehydrated pregelatinized starch may be added to the treated mixture in a sufficient quantity, especially in an amount of 2.5–4% by weight, in order to confer on the present product the desired final viscosity which it will be able to acquire during defrosting, for example.

The mixture can be continuously frozen with the aid of an apparatus capable of mixing and transporting the mixture on and along a surface cooled by circulation of a cryogenic fluid, and provided with a device for injecting gas for the overrun, such as a scraped-surface heat exchanger or an extruder for the ice cream industry, for example.

The mixture is frozen to a temperature of between −8° C. and −3° C., namely a temperature where the mixture is still malleable and formable.

The mixture can be caused to acquire overrun during the freezing by injecting into the mixture an inert or noninert gas such as air, oxygen, nitrogen and/or carbon dioxide gas, up to a percentage overrun of about 40–120% by volume, for example.

During the continuous freezing stage, the structure of the gelatinized and/or swollen starch may be at least partially destroyed by a shearing stress exerted on the mixture during its mixing and transport on and along a cooled surface. The loss of viscosity which may result therefrom is counterbalanced by a gain in unctuosity, which adds to the smoothness in the mouth conferred by the fat.

A loss in viscosity can also be compensated for by the addition of dehydrated pregelatinized starch at the beginning of the freezing process, it being possible for this starch to escape shearing stress during the freezing due to the fact that it is not swollen or impregnated with water at the beginning and that it does not have time to swell during the freezing process, but it being possible for this starch to subsequently develop viscosity during defrosting of the product, or during its regeneration (hot sauce).

The mixture thus frozen can be continuously discharged in the form of a tube or a ribbon which can be cut and/or formed into pieces and/or portions with the aid of a cutting device such as a cutting wire and/or a forming device comprising moulding cells or individual or collective packagings of the desired shape, for example.

The pieces and/or portions can then be deep-frozen, especially in individual or collective packaging, to a traditional deep-freezing temperature such as a temperature of less than or equal to −20° C., for example.

The present product may be defrosted in any manner known to the housewife.

However, the present product is particularly well suited to microwave defrosting because it can already have a malleable texture, which makes it possible to prepare portions thereof with a spoon, after a time which is as short as about 30–120 s, even though it has still only reached a temperature close to defrosting, especially a temperature of about −5° C. to 0° C., for example.

EXAMPLES

The examples below illustrate a few embodiments of the present product and of the present manufacturing process. In these examples, the percentages and parts are given by weight based upon final product weight unless otherwise stated.

Example 1

A deep-frozen Béchamel-type white sauce is prepared.

To this effect, a mixture is prepared which has the following composition, in % by weight:

| Nongelatinized modified starch* | 8% |
|---|---|
| Sunflower oil | 8% |
| Powdered skimmed milk | 8% |
| Fine salt | 0.5% |
| Water | Balance to 98% |

*Modified maize starch marketed by the company National Starch under the name COLFLO 67.

The mixture is treated by heating, with stirring, to 95° C. and kept at this temperature for 3 min.

2% of a dehydrated pregelatinized starch (maize starch marketed by the company National Starch under the name ULTRASPERCE 5) is added to the mixture, introducing in parallel the treated mixture and the dehydrated pregelatinized starch into the inlet of a BC 21-type twin-screw extruder manufactured by the firm Clextral.

The extruder is equipped with nine components allowing the freezing of the product by circulation of alcohol cooled to −40° C.

The mixture leaves the apparatus as extruded tubular forms having a temperature of −3° C. and an ice cream texture. It is formed into family portions by filling plastic-coated carton cups with it and it is deep-frozen at −20° C.

The product, when microwave defrosted, has, after about 30 s, a temperature of −4° C. and a malleable texture which makes it possible to measure it out with a spoon.

The product, when heated to a temperature for consuming hot, has a smooth, creamy and more unctuous texture than that which can be obtained by preparing a béchamel sauce from the same ingredients fresh.

Example 2

A deep-frozen carrot and celery mousse is prepared.

To this effect, a mixture is prepared which has the following composition, in % by weight:

| Carrot and celery pulp | 55% |
|---|---|
| Sunflower oil | 4% |
| Butter oil | 4% |
| Nongelatinized modified starch* | 5% |
| Powdered egg white | 1% |
| Lemon concentrate | 0.5% |
| Spices and sugar | 3% |
| Water | Balance to 99% |

*Modified maize starch marketed by the company National Starch under the name COLFLO 67.

To do this, the starch, water and oil are first mixed, this mixture is treated by heating, with stirring, to 95° C. and kept at this temperature for 3 min and the other ingredients are added thereto.

1% of a dehydrated pregelatinized starch (maize starch marketed by the company National Starch under the name ULTRASPERCE 5) is added to the mixture during its introduction into the same extruder as that described in Example 1.

During the freezing of the mixture in the extruder, it is caused to acquire overrun by injecting nitrogen to a percentage overrun of 60%.

The mixture leaves the apparatus as extruded tubular forms with overrun, having a temperature of −7° C. and an ice cream texture. It is formed into individual portions by filling plastic-coated carton cups with it and it is deep-frozen at −20° C.

After 30–45 s of microwave defrosting, the product has a temperature of −5° C. and a malleable, creamy aerated texture with a pleasant mouthfeel.

Example 3

A deep-frozen anchovy paste is prepared.

To this effect, a mixture is prepared which has the following composition, in % by weight:

| Tomato pulp and anchovy paste | 50% |
|---|---|
| Margarine | 6% |
| Butter oil | 6% |
| Nongelatinized modified starch* | 8% |
| Water | Balance to 99% |

*Modified maize starch marketed by the company National Starch under the name COLFLO 67.

To do this, the starch, water and oil are first mixed, this mixture is treated by heating, with stirring, to 95° C. and kept at this temperature for 5 min and the other ingredients are added thereto.

1% of a dehydrated pregelatinized starch (maize starch marketed by the company National Starch under the name ULTRASPERCE 5) is added to the mixture during its introduction into the same extruder as that described in Example 1.

During the freezing of the mixture in the extruder, it is caused to acquire overrun by injecting nitrogen to a percentage overrun of 40%.

The mixture leaves the apparatus as extruded tubular forms with overrun, having a temperature of −5° C. and an ice cream texture. It is formed into household portions by filling plastic-coated carton cups with it and it is deep-frozen at −20° C.

After 30 s of microwave defrosting, the product has a temperature of −4° C. and a malleable, spreadable aerated texture with a pleasant mouthfeel.

What is claimed is:

1. A process for preparation of a food product comprising mixing and heating an ungelatinized starch, a fat and water to obtain a mixture containing hydrated gelatinized starch, introducing the mixture and a dehydrated pregelatinized starch into an apparatus for mixing and cooling the mixture and dehydrated pregelatinized starch for obtaining a frozen mixture from the apparatus and treating the mixture and dehydrated pregelatinized starch in the apparatus so that a frozen mixture is obtained from the apparatus which has a temperature of between −8° C. and −3° C. and then cutting the frozen mixture obtained into portions and then freezing the portions.

2. A process according to claim 1 wherein the ungelatinized starch is selected from the group consisting of native starch and ungelatinized modified starch and wherein the mixture is heated at a temperature of from 80° C. to 100° C. for from 2 minutes to 30 minutes.

3. A process according to claim 1 further comprising mixing and heating a substance selected from the group consisting of non-fat milk solids, vegetable pulp, egg solids, sugar, spice and salt with the ungelatinized starch, fat and water to obtain the mixture.

4. A process according to claim 1 wherein, by weight based upon frozen mixture weight, from 2% to 10% of the ungelatinized starch, from 4% to 12% fat and from 60% to 85% water are mixed to obtain the mixture and the dehydrated pregelatinized starch is introduced for mixing with the mixture in an amount of from 2.5% to 4%.

5. A process according to claim 4 further comprising mixing and heating non-fat milk solids with the ungelatinized starch, fat and water to obtain the mixture so that the milk solids are present and in an amount, by weight based upon frozen mixture weight, of up to 10%.

6. A process according to claim 4 further comprising mixing and heating egg solids with the ungelatinized starch, fat and water to obtain the mixture so that the egg solids are present and in an amount, by weight based upon frozen mixture weight, of up to 5%.

7. A process according to claim 1 further comprising, while treating to obtain the frozen mixture, overrunning the mixture and dehydrated pregelatinized starch.

8. A process according to claim 7 wherein the mixture and dehydrated pregelatinized starch are overrun so that the frozen mixture has, by volume, an overrun of from 40% to 120%.

9. A process according to claim 1 wherein the apparatus is an extruder.

10. A process according to claim 9 wherein the extruder is a twin-screw extruder.

11. A process for preparation of a food product comprising mixing and treating a dehydrated pregelatinized starch, a fat and water so that the starch is hydrated and swells to obtain a mixture containing hydrated swollen gelatinized starch, introducing the mixture and further dehydrated pregelatinized starch into an apparatus for mixing and cooling the mixture and further dehydrated pregelatinized starch for obtaining a frozen mixture from the apparatus and treating the mixture and further dehydrated pregelatinized starch in the apparatus so that a frozen mixture is obtained from the apparatus which has a temperature of between −8° C. and −3° C. and then cutting the frozen mixture obtained into portions and then freezing the portions.

12. A process according to claim 11 wherein the dehydrated pregelatinized starch, fat and water mixed to obtain the mixture are mixed at a temperature of from 15° C. to 35° C. for from 2 minutes to 30 minutes for hydrating and swelling the pregelatinized starch.

13. A process according to claim 12 wherein the dehydrated pregelatinized starch, fat and water mixed to obtain the mixture are stirred for the mixing.

14. A process according to claim 11 further comprising mixing a substance selected from the group consisting of non-fat milk solids, vegetable pulp, egg solids, sugar, spice and salt with the dehydrated pregelatinized starch, fat and water to obtain the mixture.

15. A process according to claim 11 wherein, by weight based upon frozen mixture weight, from 2% to 10% of dehydrated pregelatinized starch, from 4% to 12% fat and from 60% to 85% water are mixed to obtain the mixture and the further dehydrated pregelatinized starch is introduced for mixing with the mixture in an amount of from 2.5% to 4%.

16. A process according to claim 15 further comprising mixing and heating non-fat milk solids with the dehydrated gelatinized starch, fat and water to obtain the mixture so that the milk solids are present and in an amount, by weight based upon frozen mixture weight, of up to 10%.

17. A process according to claim 15 further comprising mixing and heating egg solids with the dehydrated gelatinized starch, fat and water to obtain the mixture so that the egg solids are present and in an amount, by weight based upon frozen mixture weight, of up to 5%.

18. A process according to claim 11 further comprising, while treating to obtain the frozen mixture, overrunning the mixture and further dehydrated pregelatinized starch during the freezing.

19. A process according to claim 11 wherein the mixture and further dehydrated pregelatinized starch are overrun so that the frozen mixture has, by volume, an overrun of from 40% to 120%.

20. A process according to claim 11 wherein the apparatus is an extruder.

21. A process according to claim 20 wherein the extruder is a twin-screw extruder.

* * * * *